(12) United States Patent
Vlcan et al.

(10) Patent No.: US 9,215,211 B1
(45) Date of Patent: *Dec. 15, 2015

(54) SYSTEM AND METHOD FOR AUTOMATICALLY DETECTING AND THEN SELF-REPAIRING CORRUPT, MODIFIED OR NON-EXISTENT FILES VIA A COMMUNICATION MEDIUM

(71) Applicant: CITIBANK, N.A., New York, NY (US)

(72) Inventors: Steve Vlcan, Alexandria, VA (US); Bikram Singh Bakshi, Olney, MD (US)

(73) Assignee: Citibank, N.A., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/305,381

(22) Filed: Jun. 16, 2014

Related U.S. Application Data

(60) Division of application No. 13/728,535, filed on Dec. 27, 2012, now Pat. No. 8,756,418, which is a continuation of application No. 10/015,886, filed on Dec. 17, 2001, now Pat. No. 8,347,086.

(60) Provisional application No. 60/255,902, filed on Dec. 18, 2000.

(51) Int. Cl.
  *G06F 11/30* (2006.01)
  *H04L 29/06* (2006.01)
  *G06F 21/64* (2013.01)

(52) U.S. Cl.
  CPC ............ *H04L 63/0245* (2013.01); *G06F 21/64* (2013.01); *H04L 63/0281* (2013.01)

(58) Field of Classification Search
  CPC ............................ G06F 21/64; H04L 63/0281
  USPC .............................................. 726/13; 713/187
  See application file for complete search history.

(56) References Cited

U.S. PATENT DOCUMENTS

| | | | |
|---|---|---|---|
| 5,050,212 A | 9/1991 | Dyson | |
| 5,530,757 A | 6/1996 | Krawczyk | |

(Continued)

OTHER PUBLICATIONS

Baykal et al., On the use of Hash Functions for Defect Detection in Textures for In-camera Web inspection Systems, 2002, IEEE, pp. 26-29.

(Continued)

*Primary Examiner* — Aravind Moorthy
(74) *Attorney, Agent, or Firm* — Eric L. Sophir; Dentons US LLP

(57) ABSTRACT

A system and method of guaranteeing the presence of secure and tamper-proof remote files over a distributed communication medium, such as the Internet, is provided. The system and method automatically detects, and then self-repairs corrupt, modified or non-existent remote files. The method first performs an integrity check on a remote file and then determines whether the integrity check passed. If the integrity check passed, then the user goes through the authentication process as normal. If the integrity check fails, then the present invention redirects to an install module in order to prepare to reinstall the remote file. Via the install module, the present invention then reinstalls the remote file and the user is then taken through the authentication process as normal.

14 Claims, 6 Drawing Sheets

(56) References Cited

U.S. PATENT DOCUMENTS

| | | |
|---|---|---|
| 5,694,569 A | 12/1997 | Fischer |
| 5,812,819 A | 9/1998 | Rodwin et al. |
| 5,909,429 A | 6/1999 | Satyanarayana et al. |
| 5,991,760 A | 11/1999 | Gauvin et al. |
| 6,049,612 A | 4/2000 | Fielder et al. |
| 6,085,266 A | 7/2000 | Cotugno |
| 6,088,747 A | 7/2000 | Cotugno et al. |
| 6,108,420 A | 8/2000 | Larose et al. |
| 6,233,687 B1 | 5/2001 | White |
| 6,430,608 B1 | 8/2002 | Shaio |
| 6,460,055 B1 | 10/2002 | Midgley et al. |
| 6,532,527 B2 | 3/2003 | Selkirk et al. |
| 6,618,735 B1 | 9/2003 | Krishnaswami et al. |
| 6,665,659 B1 | 12/2003 | Logan |
| 6,694,434 B1 | 2/2004 | McGee et al. |
| 6,779,003 B1 | 8/2004 | Midgley et al. |
| 8,347,086 B2 | 1/2013 | Vlcan et al. |
| 2002/0069363 A1 | 6/2002 | Windburn |

OTHER PUBLICATIONS

Brenner, B., "LAN Fever: How to Protect Your Business from Computer Viruses," Office Systems, Office Systems Magazine Corporation, Jan. 1992, 2 pages.

International Search Report issued Jun. 26, 2002 for International Application No. PCT/US01/48374, 6 pages.

Jaeger et al, Preserving Integrity in Remote File Location and Retrieval, 1996, IEEE, pp. 53-63.

"Microsoft Press Computer Dictionary," Third Edition, Microsoft Press, 1997, pp. 276 and 510.

Okamoto, Takeshi, A Distributed Approach to Computer Virus Detection and Neutralization by Autonomous and Heterogenous Agents, 1999, IEEE, pp. 328-331.

Shintani et al, Hash Based Parallel Algorithms for Mining Association Rules, 1999, IEEE, pp. 19-30.

Spitzner, Lance, What is MD5 and why should I care?, Aug. 1999, Inside Solaris, p. 15.

SYSTEM AND METHOD FOR AUTOMATICALLY DETECTING AND THEN SELF-REPAIRING CORRUPT, MODIFIED OR NON-EXISTENT FILES VIA A COMMUNICATION MEDIUM

CROSS-REFERENCE TO RELATED APPLICATIONS

This application is a divisional application of and claims priority to U.S. patent application Ser. No. 13/728,535, filed Dec. 27, 2012, entitled "SYSTEM AND METHOD FOR AUTOMATICALLY DETECTING AND THEN SELF-REPAIRING CORRUPT, MODIFIED, OR NON-EXISTENT FILES VIA A COMMUNICATION MEDIUM," which is a continuation of and claims priority to U.S. patent application Ser. No. 10/015,886, filed Dec. 17, 2001, entitled "SYSTEM AND METHOD FOR AUTOMATICALLY DETECTING AND THEN SELF-REPAIRING CORRUPT, MODIFIED, OR NON-EXISTENT FILES VIA A COMMUNICATION MEDIUM," which claims priority to U.S. Provisional Patent Application Ser. No. 60/255,902, filed Dec. 18, 2000, entitled "SYSTEM AND METHOD FOR AUTOMATICALLY DETECTING AND THEN SELF-REPAIRING CORRUPT OR DELETED FILES OF THE AUTHENTICATION SYSTEM," all of which are herein incorporated by reference in their entirety).

This application is related to commonly-owned, non-provisional application entitled "System, Method and Computer Program Product for Enrolling and Authenticating Communication Protocol-Enabled Clients for Access to Information," U.S. application Ser. No. 09/695,060, filed on Oct. 25, 2000 (incorporated by reference in its entirety herein).

This application is related to the commonly-owned, application entitled "System, Method and Computer Program Product for Allowing Access to Enterprise Resources Using Biometric Devices," U.S. application Ser. No. 09/264,726, filed on Mar. 9, 1999, now U.S. Pat. No. 6,256,737, issued on Jul. 3, 2001 (incorporated by reference in its entirety herein).

This application is also related to the commonly-owned, application entitled "System, Method and Computer Program Product for an Authentication Management Infrastructure," U.S. application Ser. No. 09/517,121, filed on Mar. 1, 2000 (incorporated by reference in its entirety herein).

BACKGROUND OF THE INVENTION

1. Field of the Invention

The present invention relates to a system and method for automatically detecting and then self-repairing corrupt, modified or non-existent (e.g. deleted) files via a communication medium.

2. Related Art

The importance to the modern economy of rapid information access and exchange cannot be overstated. This explains the exponentially increasing popularity of the Internet, intranets, the wireless exchange of information, and so forth (including any distributed communication medium or system). This importance keep growing for businesses that conduct most, if not all, of their transactions via one or more of these communication mediums. Examples of such applications or services include business-to-business and business-consumer-e-commerce transactions, online applications such as banking, stock-trading, shopping, personalized content web sites, and so forth.

However, there are some problems. One problem is the protection of confidential information by using an adequate authentication system. Assuming that an adequate authentication system is in place to protect such confidential information, another problem results from the nature of a distributed communication medium or system. With a distributed communication system, modules or files that make up the authentication system are most likely to be physically located on different computers within the distributed communication system. Therefore, for modules that are located remotely from the authentication system administrator, it is difficult to guarantee their integrity. Only once the system administrator becomes aware of the lost integrity of a file can the file be replaced.

The integrity of a file or module fails when the file or module is altered, is deleted, or is tampered with in any way. Without the guarantee of integrity at all times, the value of any authentication system to businesses conducting most of their transaction via a distributed communication system (and to their potential customers) decreases.

SUMMARY OF THE INVENTION

A system and method of guaranteeing the presence of secure and tamper-proof remote files over a distributed communication medium, such as the Internet, is provided. The system and method automatically detects, and then self-repairs, modified, corrupt or non-existent remote files. In an embodiment of the present invention, the method first performs an integrity check on a remote file and then determines whether the integrity check passed. If the integrity check passed, then the user goes through the authentication process as normal. If the integrity check fails, then the present invention redirects to an install module in order to prepare to reinstall the remote file. Via the install module, the present invention then reinstalls the remote file and the user is then taken through the authentication process as normal.

BRIEF DESCRIPTION OF THE FIGURES

The present invention will be described with reference to the accompanying drawings, wherein.

DETAILED DESCRIPTION OF THE PREFERRED EMBODIMENTS

A. Overview of the Invention

The present invention provides a system and method of guaranteeing the presence of secure and tamper-proof remote files over a distributed communication medium, such as the Internet. The present invention automatically detects, and then self-repairs, modified, corrupt or non-existent remote files. In a high level operation of the present invention, the present invention first performs an integrity check on a remote file and then determines whether the integrity check passed. If the integrity check passed, then the user goes through the authentication process as normal. If the integrity check fails, then the present invention redirects to an install module in order to prepare to reinstall the remote file. Via the install module, the present invention then automatically reinstalls the remote file. This is the self-repairing aspect of the present invention. The user is then taken through the authentication process as normal.

It is important to note that while the present invention is described with reference to the Internet and the authentication system (described in commonly-owned, U.S. application Ser. No. 09/695,060), it is not meant to limit the present invention. The present invention also applies to communication mediums such as intranets, wireless networks, and so forth. In addition the present invention applies to any application or system that has one or more modules or files physically located at a remote location, and thus is not limited to the authentication system describe herein. Finally, the present invention is not limited to remote files, but can be used for any file whose continuing integrity is desirable.

B. System Architecture Overview

Figure 1:
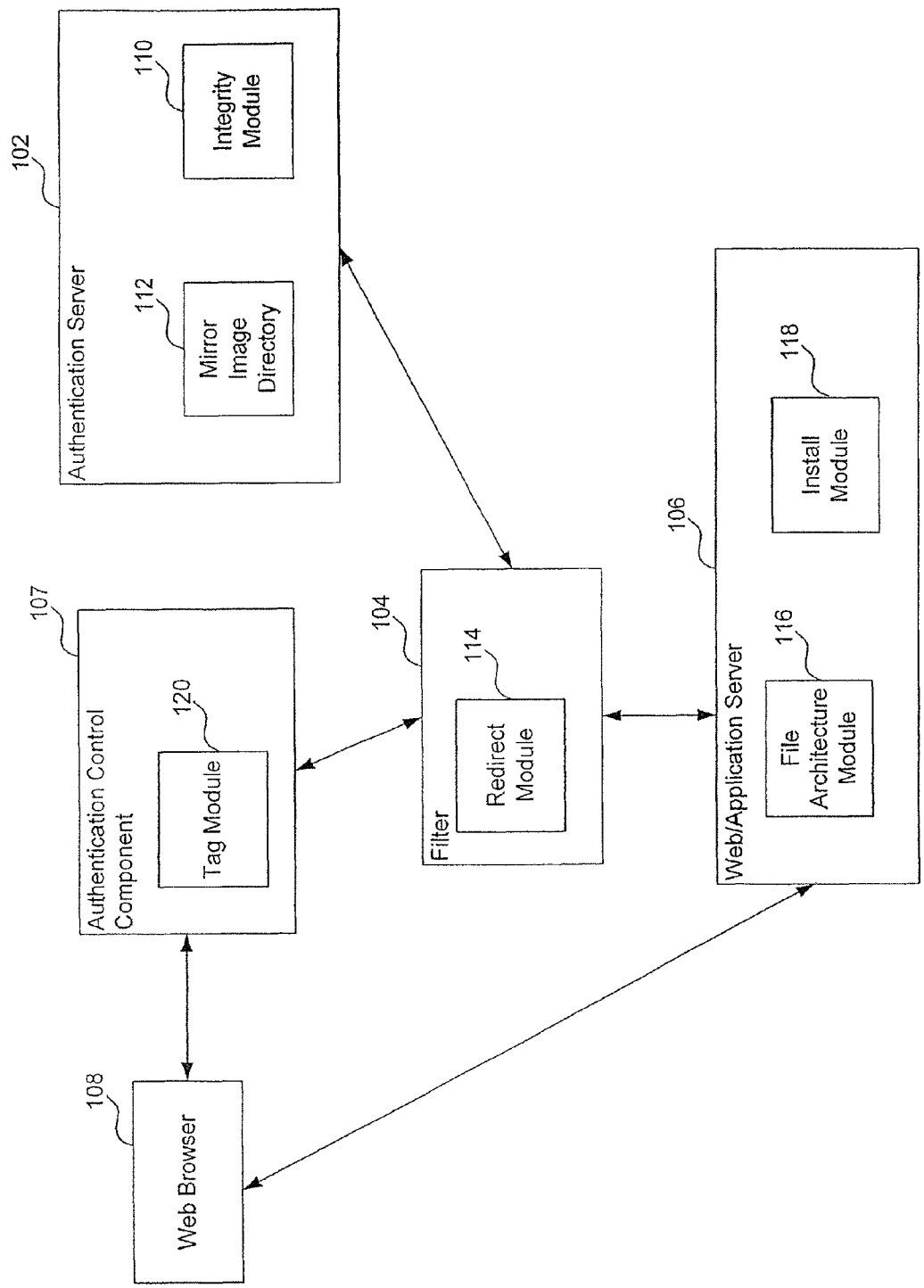
FIG. 1 is a block diagram representing an example operating environment of the present invention according to an embodiment.

FIG. 1 is a block diagram representing an example operating environment of the present invention. It should be understood that the example operating environment in FIG. 1 is shown for illustrative purposes only and does not limit the invention. Other implementations of the operating environment described herein will be apparent to persons skilled in the relevant art(s) based on the teachings contained herein, and the invention is directed to such other implementations. Referring to FIG. 1, an authentication server 102, a filter 104, a web/application server 106, an authentication control component 107 and a web browser 108 are shown. Authentication server 102, filter 104, web/application server 106, authentication control component 107 and web browser 108 are components of, or related to, the authentication system described in U.S. application Ser. No. 09/695,060. It is important to note that web/application server 106 and web browser 108 are not components of the authentication system or the present invention. Next, the components shown in FIG. 1 that are specific to the present invention are introduced.

As shown in FIG. 1, an integrity module 110 and a mirror image directory 112 are associated with authentication server 102. A redirect module 114 is associated with filter 104. An install module 118 and a file architecture module 116 are associated with web/application server 106. Finally, a tag module 120 is associated with authentication control component 107. First, background information of the components of the general authentication system are described. Then, each of the components specific (and their relationship to the components of the general authentication system) to the present invention are described.

Authentication server 102 is the engine of the authentication system described in detail in related, U.S. application Ser. No. 09/517,121 and U.S. Pat. No. 6,256,737. The various collections of data stored in authentication server 102, along with a typical sequence of steps an administrator may take to initially setup authentication server 102, are also described in detail in related, U.S. application Ser. No. 09/517,121 and U.S. Pat. No. 6,256,737. For convenience, an overview of authentication server 102 is provided herein.

Typical data stored in authentication server 102 include, but are not limited to, templates, policies, groups, device IDs, user IDs, computer IDs and application IDs. One or more unique templates is created and stored in authentication server 202 each time a user enrolls on a different identification device. A template stores the user's unique measurement for a particular biometric device (which is then used to match against the user's "live" measurement when the device is attempting to identify the user) or password, etc., for a non-biometric device.

Policies of authentication server 102 determine the method or way in which a user is to be authenticated by authentication server 202. Specific examples of pre-defined policies include an OR policy, an AND policy, a CONTINGENT policy, a RANDOM policy, a THRESHOLD policy, a multi-user policy, a multi-location policy, a multi-template policy, a user dependent policy, a location restriction policy, and a computer/device specific policy. The administrator may also define or configure other policies.

Each pre-defined policy has a list of devices (or device IDs) associated with it. The list of devices identifies the identification devices that are used to execute the particular policy. Each device in the list of devices may have a threshold value and a timeout value associated with it (this is typically true with biometric devices). The threshold value (e.g., false acceptance rate) indicates the level of identification the device must determine for the user to pass the device. The timeout value indicates the time in which the device has to identify the user to the level of identification indicated by the threshold value.

Groups in the authentication system are a logical way of combining one or more users (or user IDs) that need access to the same set of information stored on web/application server 106. For example, all users in the Internet may be allowed to access the login page of an online application that allows users to trade stocks. For the same online application, the user and only other users specific by the user would be in the group that is allowed to access confidential information of the user. Therefore, one of the groups can be defined as "USR24458 group." Here, when a user is put into "USR24458 group," that user (once authenticated by authentication server 102) has access to the same resources as all the other users in "USR24458 group."

Each user can be put into one or more groups. When the user attempts to gain access to information in a particular group, the user must be authenticated by whichever policy is associated with that particular group.

A device ID identifies an identification device. Each identification device has a unique ID. Thus, the collection of device Ms allows authentication server 102 to uniquely identify each identification device attached to communication protocol-enabled clients (web browsers) in the Internet. Similarly, a user ID uniquely identifies a user utilizing the present invention. Filter 104 and web/application server 106 will be described next.

Filter 104 is a lightweight component that resides with web/application server 106 (i.e., any web server or application server that requires the authentication services of the present invention). The code for filter 104 is preferably written in the native language (e.g., C, C++, Java, etc) of web/application server 106 for optimum performance. In one embodiment of the present invention, filter 104 looks at all requests sent from web browser 108 and intercepts any request for authentication from web browser 108. Filter then forwards the authentication requests to authentication server 102.

Filter 104 is designed to interoperate with existing web servers including, but not limited to, Netscape Enterprise Server (NES), Microsoft Internet Information Server (MS IS), Apache, etc., to provide authentication services for accessing web sites. Filter 104 may also be used with application servers including, but not limited to, BEA WebLogic, SilverStream Application Server, Oracle AppServer, Sun NetDynamics, Microsoft Site Server, etc., to provide authentication services for web applications including online banking, online stock trading, and so forth. As shown in FIG. 1, filter 104 is connected to web/application server 106. Web/application server 106 represents both a web server and an application server as mentioned above. Authentication control component 107 and web browser 108 are described next.

Authentication control component 107 is responsible for managing the process of capturing user credentials and communicating the result of the capturing process to authentication server 102 via filter 104.

Web browser 108 is a software application that makes it easy for users to locate and display web pages. Examples of web browsers include Netscape Navigator and Microsoft's Internet Explorer. A web browser is one example of a communication protocol-enabled client, as described herein. Other examples of a communication protocol-enabled client may include, but are not limited to, a TCP/IP client and a wireless client. Each of the components specific to the present invention are described next.

As mentioned above, an integrity module 110 and a mirror image directory 112 are associated with authentication server 102. Integrity module 110 works with authentication server 102 in order to perform an integrity check on a remote file or a group of files. The integrity of a file or module fails when the file or module is altered, is deleted, or is tampered with in any way. The integrity check feature of the present invention is described with reference to FIG. 3 below. Mirror image directory 112 contains an identical copy of each remote file when it was first downloaded to its remote location. The copy of a remote file stored in mirror image directory 112 is assumed to be correct since it is located at authentication server 102 and thus under the control of the administrator of the authentication system. As will be described below, a remote file and its copy stored in mirror image directory 112 are compared in order to determine the integrity of the remote file (or module). Redirect module 114 is described next.

Redirect module 114 is associated with filter 104. As stated above, if a remote file fails the integrity check of the present invention, then the present invention provides the capability to reinstall a trustworthy version of the same file at the remote site. Redirect module 114 works with install module 118 to inform it of the location of the remote file that failed the integrity check. In an embodiment of the present invention, redirect module 114 is implemented via a JavaScript function call. The redirect feature of the present invention is described in more detail below with reference to FIG. 4.

Install module 118 and file architecture module 116 are associated with web/application server 106. Once a remote file has failed the integrity check, then it is reinstalled at its remote location. Install module 118 reads a request from authentication control component 107 to generate a reinstallation web page. The reinstallation web page is then used to reinstall the remote file. The reinstall feature of the present invention is described in more detail below with reference to FIG. 5.

In an embodiment of the present invention, install module 116 is implemented as a Java Servlet. Using a servlet allows the present invention to handle all remote files (or components) that might fail with one central code base. Otherwise, multiple web pages would have to be written for each potential remote file that could fail the integrity check. Prior to describing file architecture module 116, tag module 120 will be described.

Tag module 120 is associated with authentication control component 107. The implementation of tag module 120 will vary based on the specifics of the web browser, the operating system environment and the client software on the remote system. The intent of tag module 120 is to provide a guaranteed mechanism for overwriting the modified, damaged or corrupt components with the correct version of the appropriate software from web/application server 106.

For example, in an embodiment of the present invention, tag module 120 may be implemented as a <OBJECT> html tag as used in Microsoft Internet Explorer. Tag module 120 is understood by web browser 108. In an embodiment of the present invention, tag module 120 allows the reinstallation web page generated by install module 118 to install a component that is contained in a .cab file. A .cab file is a zipped archive that contains several dlls or other files, and instructions about how to install the .cab file. Each remote file that is checked by the present invention for integrity has its own .cab file. In a embodiment of the present invention, cab files are only downloaded if the # Version specification in the CODE-BASE is newer than any existing version on the client. By specifying a maximum version number, the HTML web page can guarantee that the .cab file specified will be installed on authentication control component 107 (i.e., made accessible to the user via web browser 108).

File architecture module 116 (that is associated with web/application server 106) instructs a .cab file on how to install itself. File architecture module 116 explicitly lists which file(s) to install, where to store the file, and what version of the particular file to overwrite. In an embodiment of the present invention, each file to be installed uses a version parameter of "Version=–1, –1, –1, –1," which means to overwrite an existing file. The high level operation of the present invention is described next.

C. Operation of the Present Invention

Figure 2:
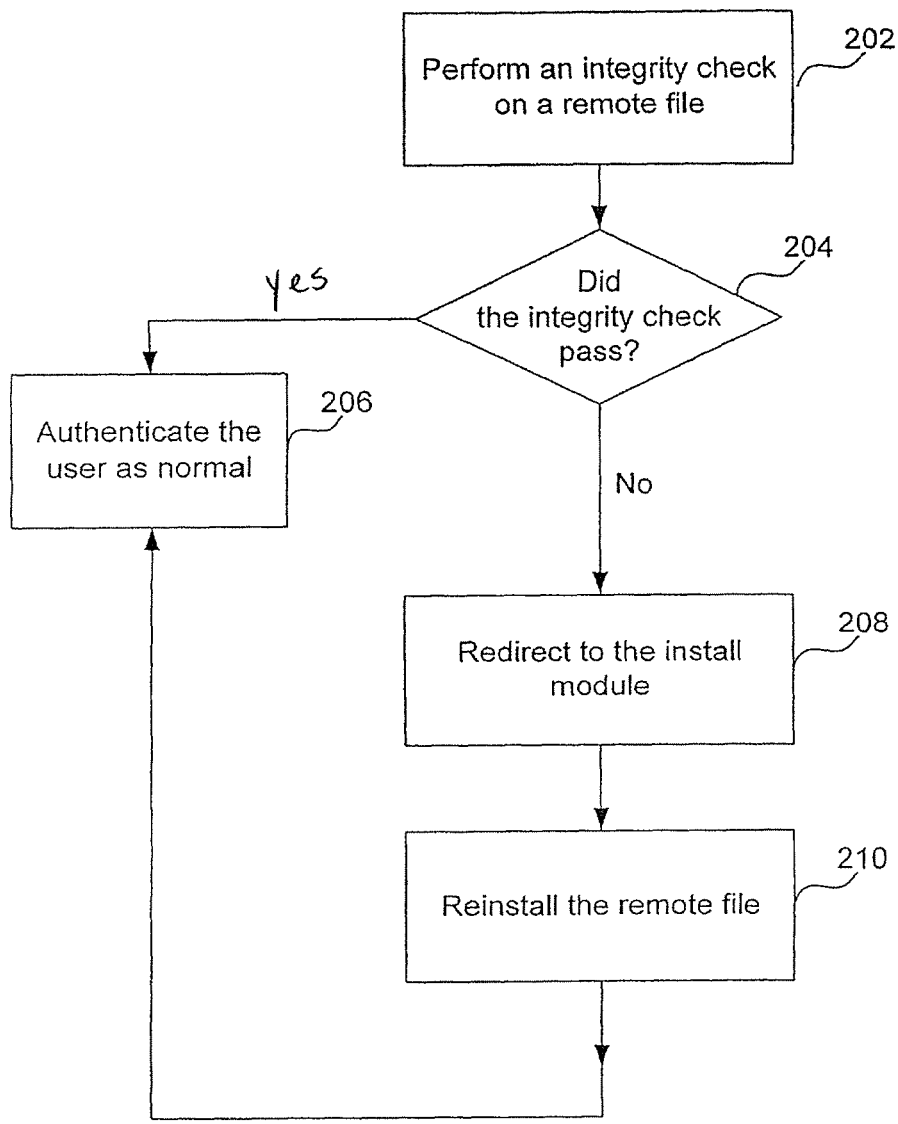
FIG. 2 is a flowchart illustrating the high level operation of the present invention according to an embodiment.

FIG. 2 is a flowchart illustrating, the high level operation of the present invention according to an embodiment. In FIG. 2, control starts at step 202. In step 202, the present invention performs an integrity check on a remote file. The integrity check feature of the present invention is described in more detail below with reference to FIG. 3. Control then passes to step 204.

In step 204, it is determined whether the integrity check passed. The integrity of a file or module fails when the file or module is altered, is deleted, or is tampered with in any way. If the outcome to step 204 is positive, then control passes to step 206. Alternatively control passes to step 208.

In step 206, the remote file has passed the integrity check and authentication sever 102 attempts to authenticate the user as described in U.S. application Ser. No. 09/695,060. The flowchart in FIG. 2 ends at this point.

In step 208, the remote file has failed the integrity check and the present invention redirects to install module 118 in order to prepare to reinstall the remote file. The redirect feature of the present invention is described in more detail below with reference to FIG. 4. Control then passed to step 210.

In step 210, the present invention reinstalls (or self-repairs) the remote file at its remote location. The reinstall feature of the present invention is described in more detail below with reference to FIG. 5. Once the remote file has been reinstalled, control passes to step 206 where authentication sever 102 attempts to authenticate the user as normal. The flowchart in FIG. 2 ends at this point. The integrity check feature (step 202) of the present invention is now described in more detail below with reference to FIG. 3.

Figure 3:
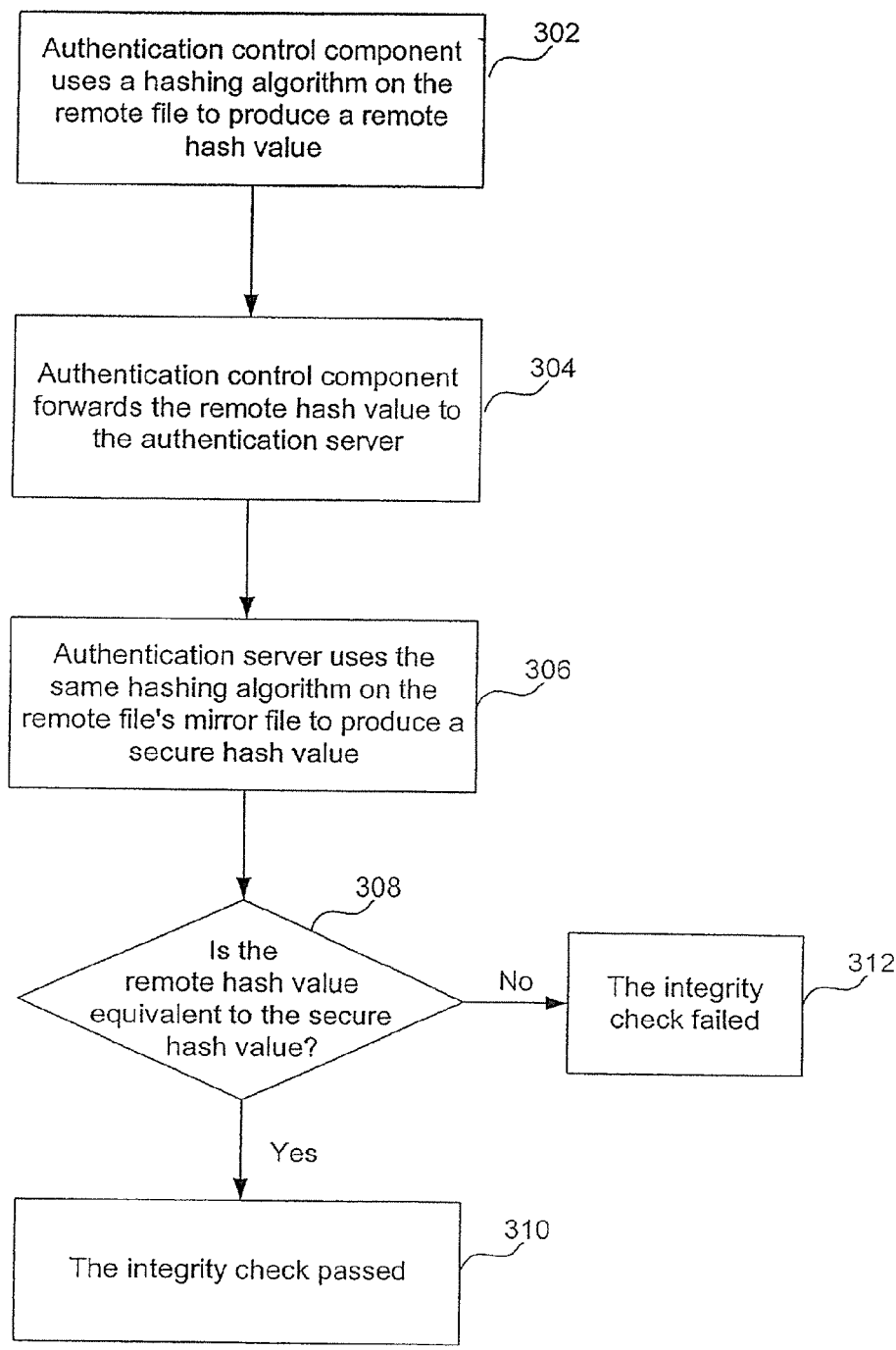
FIG. 3 is a flowchart illustrating the integrity check feature of the present invention according to an embodiment.

In FIG. 3, control starts at step 302. In step 302, it is assumed that authentication control component 107 is the remote location, but the present invention is limited to remote files at authentication control component 107. Here, authentication control component 107 uses a hashing algorithm on the remote file to produce a remote hash value. The present invention is not limited to using a hashing algorithm. In fact, any method of analyzing the state of a file may be used. Control then passes to step 304.

In step 304, authentication control component 107 forwards the remote hash value to authentication server 102. Control then passes to step 306.

In step 306, authentication server 102 uses the same hashing algorithm (as authentication control component 107 used on the remote file) on the remote file's mirror file stored in mirror image directory 112 to produce a secure hash value. The mirror file is a valid copy of the remote file (before any compromise). Control then passes to step 308.

In step 308, it is determined whether the remote hash value and the secure hash value are equivalent. If the outcome to step 308 is positive, then control passes to step 310. Alternatively, control passes to step 312.

In step 310, the integrity check passed. Here, the present invention has determined that the remote file has not been comprised in any way since it was last installed at its remote location.

In step 312, the integrity check has failed. Here, the present invention has determined that the remote file has been comprised in some way since it was last installed at its remote location and therefore must be reinstalled. The redirect feature (step 208 of FIG. 2) of the present invention is described next in more detail with reference to FIG. 4.

Figure 4:
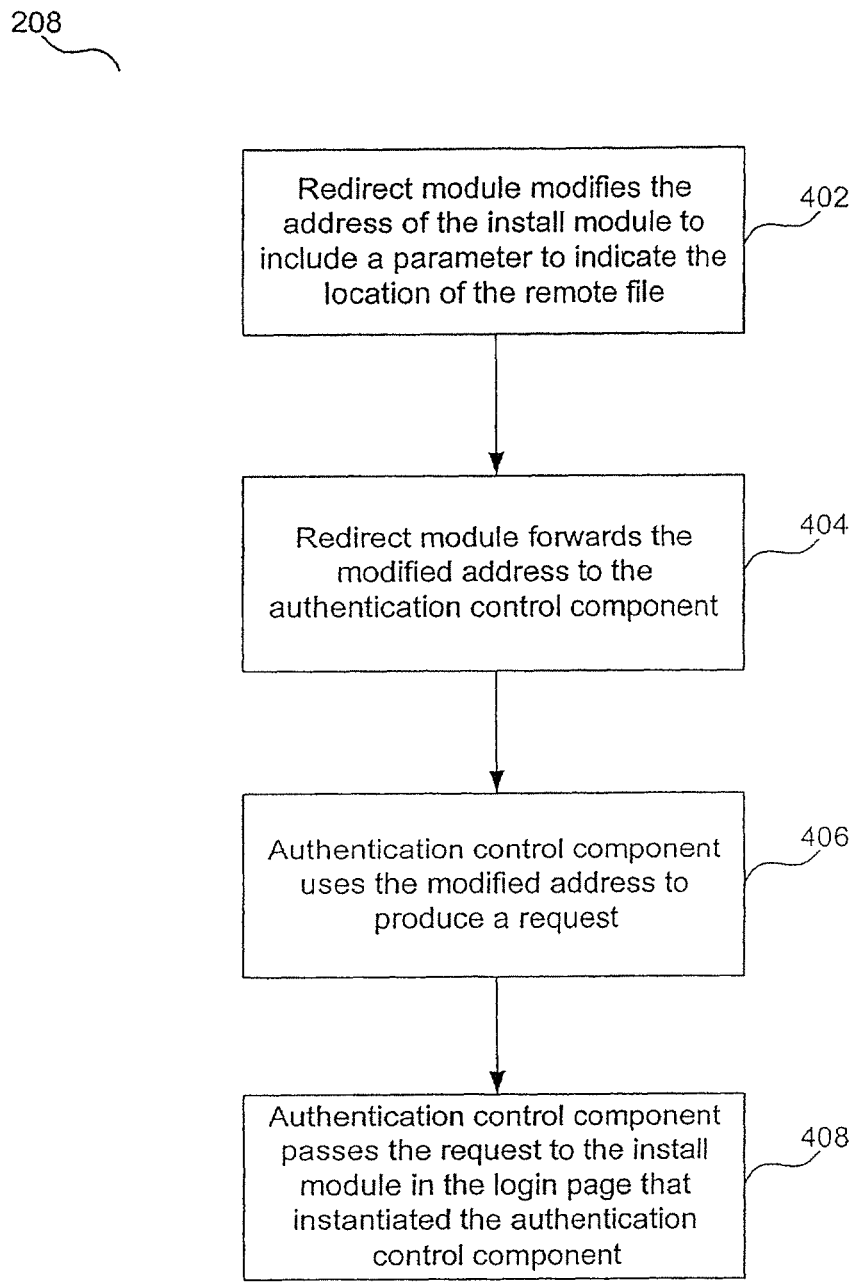
FIG. 4 is a flowchart illustrating the redirect check feature of the present invention according to an embodiment.

In FIG. 4, control starts at step 402. In step 402, redirect module 114 (associated with filter 104) modifies the address of install module 118 to include a parameter that indicates the location of the remote file. As mentioned above, in an embodiment of the present invention redirect module 114 is implemented via a JavaScript function call. Control then passes to step 404.

In step 404, redirect module 114 forwards the modified address to authentication control component 107. Control then passes to step 406.

In step 406, authentication control component 107 uses the modified address to produce a request. Control then passes to step 408.

In step 408, authentication control component 107 passes the request to install module 118 in the login page that instantiated authentication control component 107. At this point the flowchart in FIG. 4 ends. The reinstall feature (step 210 of FIG. 2) of the present invention now described in more detail with reference to FIG. 5.

Figure 5:
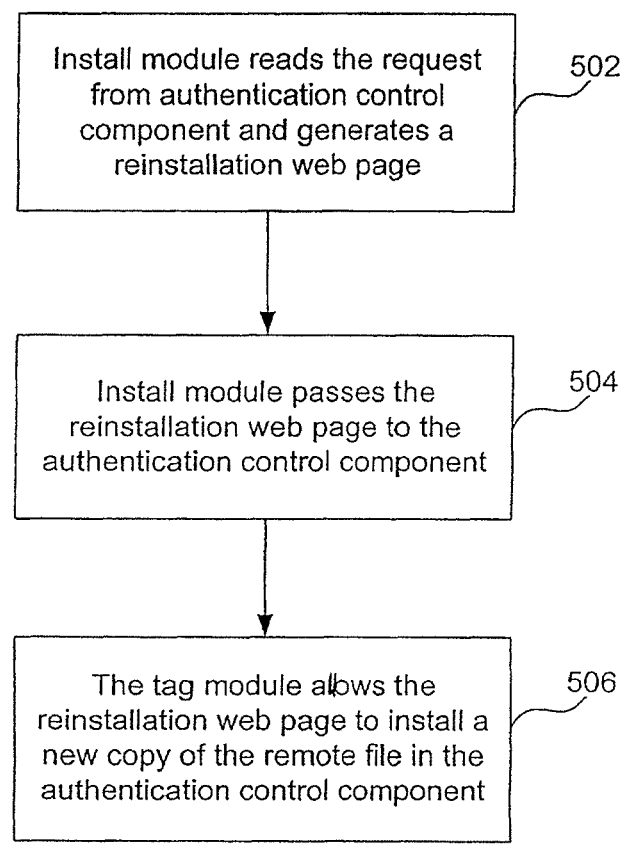
FIG. 5 is a flowchart illustrating the reinstall feature of the present invention according to an embodiment.

In FIG. 5, control starts at step 502. In step 502, install module 118 reads the request sent to it by authentication control component 107 and generates a reinstallation web page. As noted above, in an embodiment of the present invention install module 118 is implemented as a Java Servlet. Using a servlet allows the present invention to handle all remote files (or components) that might fail with one central code base. Otherwise, multiple web pages would have to be written for each potential remote file that could fail the integrity check. Control then passes to step 504.

In step 504, install module 118 passes the reinstallation web page to authentication control component 107. Control then passes to step 506.

In step 506, tag module 120 (associated with authentication control component 107) allows the reinstallation web page to install a new copy of the remote file. As stated above, the implementation of tag module 120 will vary based on the specifics of the web browser, the operating system environment and the client software on the remote system. For example, in an embodiment of the present invention, each remote file that is checked by the present invention for integrity has its own .cab file as used in Microsoft Internet Explorer. In an embodiment, cab files are only downloaded if the # Version specification in the CODEBASE is newer than any existing version on the client. By specifying a maximum version number, the reinstallation web page can guarantee that the .cab file specified will be installed on authentication control component 107 (i.e., made accessible to the user via web browser 108).

File architecture module 116 (that is associated with web/application server 106) instructs a .cab file on how to install itself. File architecture module 116 explicitly lists which file(s) to install, where to store the file, and what version of the particular file to overwrite. The flowchart in FIG. 5 ends at this point.

D. An Example Environment of the Present Invention

Figure 6:
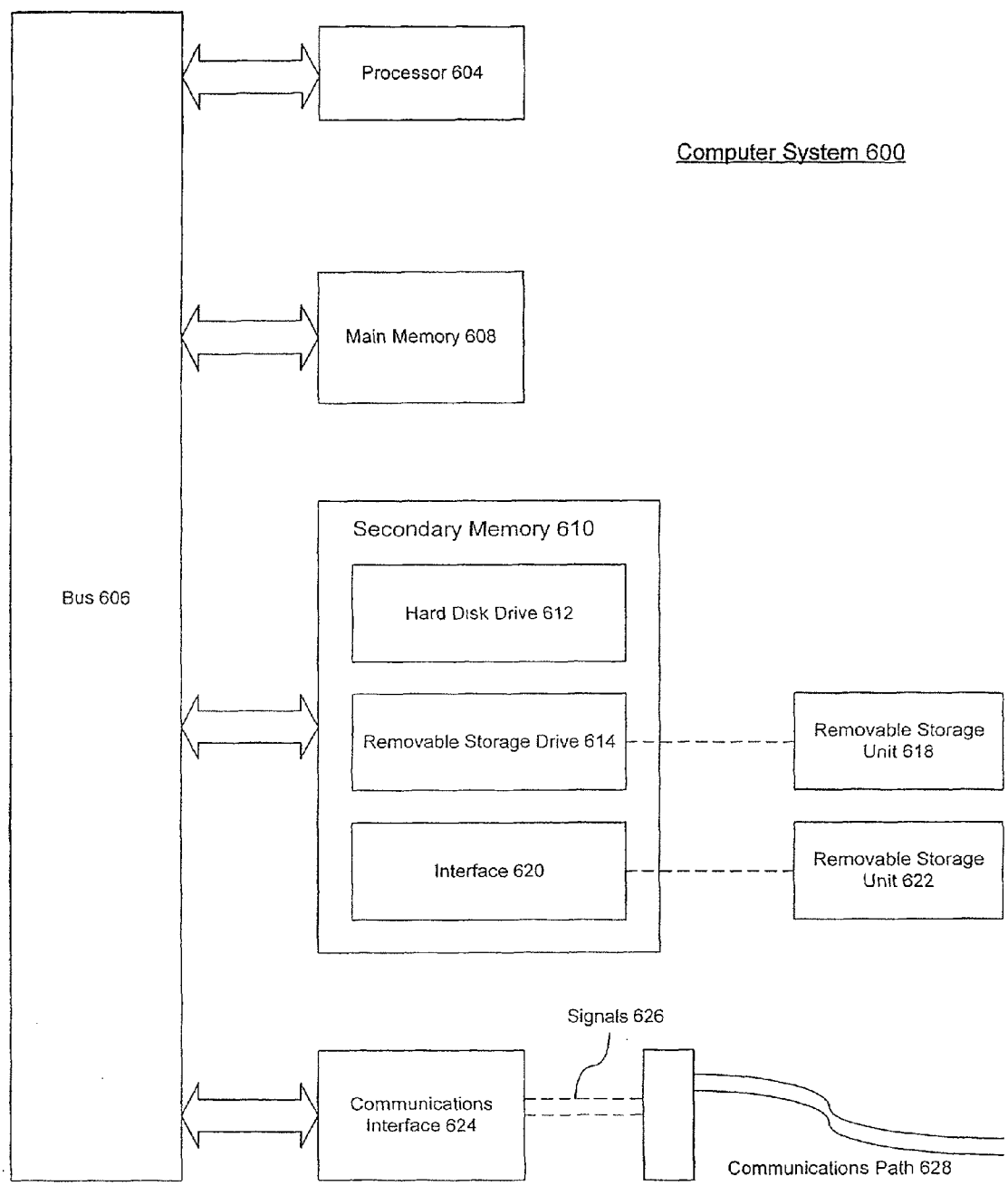
FIG. 6 illustrates an example computer that may be used to implement components of the present invention according to an embodiment.

Authentication server 102, filter 104, web/application server 106, authentication control component 107, web browser 108, integrity module 110, mirror image directory 112, redirect module 114, file architecture module 116, install module 118 and tag module 120 could be implemented using computer 600 as shown in FIG. 6. Obviously, more than one of these functional components could be implemented on a single computer 600.

The present invention may be implemented using hardware, software or a combination thereof and may be implemented in a computer system or other processing system. In fact, in one embodiment, the invention is directed toward one or more computer systems capable of carrying out the functionality described herein. The computer system 600 includes one or more processors, such as processor 604. The processor 604 is connected to a communication bus 606. Various software embodiments are described in terms of this example computer system. After reading this description, it will become apparent to a person skilled in the relevant art how to implement the invention using other computer systems and/or computer architectures.

Computer system 600 also includes a main memory 608, preferably random access memory (RAM), and can also include a secondary memory 610. The secondary memory 610 can include, for example, a hard disk drive 612 and/or a removable storage drive 614, representing a floppy disk drive, a magnetic tape drive, an optical disk drive, etc. The removable storage drive 614 reads from and/or writes to a removable storage unit 618 in a well known manner. Removable storage unit 618, represents a floppy disk, magnetic tape, optical disk, etc. which is read by and written to by removable storage drive 614. As will be appreciated, the removable storage unit 618 includes a computer usable storage medium having stored therein computer software and/or data.

In alternative embodiments, secondary memory 610 may include other similar means for allowing computer programs or other instructions to be loaded into computer system 600. Such means can include, for example, a removable storage unit 622 and an interface 620. Examples of such can include a program cartridge and cartridge interface (such as that found in video game devices), a removable memory chip (such as an EPROM, or PROM) and associated socket, and other removable storage units 622 and interfaces 620 which allow software and data to be transferred from the removable storage unit 618 to computer system 600.

Computer system 600 can also include a communications interface 624. Communications interface 624 allows software and data to be transferred between computer system 600 and external devices. Examples of communications interface 624 can include a modem, a network interface (such as an Ethernet card), a communications port, a PCMCIA slot and card, etc. Software and data transferred via communications interface 624 are in the form of signals which can be electronic, electromagnetic, optical or other signals capable of being received by communications interface 624. These signals 626 are provided to communications interface via a channel 628. This channel 628 carries signals 626 and can be implemented using wire or cable, fiber optics, a phone line, a cellular phone link, an RF link and other communications channels.

In this document, the terms "computer program medium" and "computer usable medium" are used to generally refer to media such as removable storage device 618, a hard disk installed in hard disk drive 612, and signals 626. These computer program products are means for providing software to computer system 600.

Computer programs (also called computer control logic) are stored in main memory and/or secondary memory 610. Computer programs can also be received via communications interface 624. Such computer programs, when executed, enable the computer system 600 to perform the features of the present invention as discussed herein. In particular, the computer programs, when executed, enable the processor 604 to perform the features of the present invention. Accordingly, such computer programs represent controllers of the computer system 600.

In an embodiment where the invention is implemented using software, the software may be stored in a computer program product and loaded into computer system 600 using removable storage drive 614, hard drive 612 or communications interface 624. The control logic (software), when executed by the processor 604, causes the processor 604 to perform the functions of the invention as described herein.

In another embodiment, the invention is implemented primarily in hardware using, for example, hardware components such as application specific integrated circuits (ASICs). Implementation of the hardware state machine so as to perform the functions described herein will be apparent to persons skilled in the relevant art(s). In yet another embodiment, the invention is implemented using a combination of both hardware and software.

E. Conclusion

While various embodiments of the present invention have been described above, it should be understood that they have been presented by way of example, and not limitation. It will be apparent to persons skilled in the relevant art that various changes in form and detail may be made therein without departing from the spirit and scope of the invention. This is especially true in light of technology and terms within the relevant art(s) that may be later developed. Thus, the present invention should not be limited by any of the above-described exemplary embodiments, but should be defined only in accordance with the following claims and their equivalents.

What is claimed is:

1. A method for installing a file at a remote location, the method comprising:

determining, by a computer, whether the file is the same as a previously downloaded file;

when the file is not the same as the previously downloaded file, reinstall, by the computer, the previously downloaded file, wherein reinstalling the previously downloaded file comprises:

redirecting, by the computer, to an install module by a redirect module when the file is not the same as the previously downloaded file, wherein redirecting to the install module comprises:

modifying, by a computer, an address of the install module by the redirect module to include a parameter to indicate a remote location for installation; and installing, by a computer, the previously downloaded file by the install module at the remote location via a network.

2. The method of claim 1, wherein installing the remote file comprises:

generating, by a computer, an installation web page, by the install module, based on a request from the remote location;

communicating, by a computer, the installation web page, via the communication medium, to the remote location; and installing, by a computer, the remote file at the remote location.

3. The method of claim 1, wherein the network is the Internet.

4. The method of claim 1, wherein the network is a local network.

5. The method of claim 1, wherein the network is a wireless network.

6. The method of claim 1, wherein the remote location is an authentication control component.

7. The method of claim 1, further comprising:

producing, by a computer, a request by an authentication module based on the modified address that indicates the remote location for installation; and communicating, by a computer, the request by the authentication module to the install module in a login page that attempted to instantiate the file at the remote location.

8. A method for installing a file at on a cellular device, the method comprising:

determining, by a computer, whether the file is the same as a previously downloaded file;

when the file is not the same as the previously downloaded file, reinstall, by the computer, the previously downloaded file, wherein reinstalling the previously downloaded file comprises:

redirecting, by the computer, to an install module by a redirect module when the file is not the same as the previously downloaded file, wherein redirecting to the install module comprises:

modifying, by a computer, an address of the install module by the redirect module to include a parameter to indicate installation on the cellular device; and installing, by a computer, the previously downloaded file by the install module on the cellular device.

9. The method of claim 8, wherein installing the remote file comprises:

generating, by the computer, an installation page, by the install module, based on a request from the cellular device;

communicating, by the computer, the installation page, via the communication medium, to the cellular device; and installing, by the computer, the remote file at the cellular device.

10. The method of claim 8, wherein the communication medium is the Internet.

11. The method of claim 8, wherein the communication medium is a local network.

12. The method of claim 8, wherein the communication medium is a wireless network.

13. The method of claim 8, wherein the remote location is an authentication control component.

14. The method of claim 8, further comprising:
producing, by the computer, a request by an authentication module based on the modified address that indicates installation on the cellular device; and
communicating, by the computer, the request by the authentication module to the install module in a login page that attempted to instantiate the file at the cellular device.

* * * * *